United States Patent
Ahmed et al.

(10) Patent No.: US 11,776,408 B2
(45) Date of Patent: Oct. 3, 2023

(54) METHODS AND APPARATUSES FOR DYNAMIC CLOUD-BASED VEHICLE DISPATCH

(71) Applicant: FORD GLOBAL TECHNOLOGIES, LLC, Dearborn, MI (US)

(72) Inventors: Hanan J Ahmed, Belleville, MI (US); Sena Hermiz, Farmington Hills, MI (US); Erick Michael Lavoie, Van Buren Charter Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 178 days.

(21) Appl. No.: 17/498,894

(22) Filed: Oct. 12, 2021

(65) Prior Publication Data

US 2023/0113474 A1    Apr. 13, 2023

(51) Int. Cl.
G08G 1/00 (2006.01)
G08G 1/01 (2006.01)

(52) U.S. Cl.
CPC ........... *G08G 1/202* (2013.01); *G08G 1/0129* (2013.01); *G08G 1/0133* (2013.01); *G08G 1/0145* (2013.01); *G08G 1/205* (2013.01)

(58) Field of Classification Search
CPC .... G08G 1/202; G08G 1/0129; G08G 1/0133; G08G 1/0145; G08G 1/205
See application file for complete search history.

(56) References Cited

U.S. PATENT DOCUMENTS

| 7,363,052 | B2 | 4/2008 | Lamensdorf |
| 7,855,639 | B2 | 12/2010 | Patel et al. |
| 8,040,246 | B2 | 10/2011 | Graves et al. |
| 8,630,820 | B2 | 1/2014 | Amis |
| 10,089,889 | B2 | 10/2018 | Patterson et al. |

*Primary Examiner* — Mathew Franklin Gordon

(74) *Attorney, Agent, or Firm* — Joseph Zane; Brooks Kushman P.C.

(57) ABSTRACT

Upon report of an emergency incident, a system may dispatch one or more initial entities to respond to the incident and model an initial scene, based on the reported data. The system may further determine the availability of travel data, request available travel data and advise an entity of path feasibility. The system also determines availability of onsite data covering one or more locations associated with the incident and requests available onsite data. This data is used to update the scene model and determine additional necessary dispatches, data gathering, or both. Until additional data is determined to be no longer needed, the processor is configured to continue to: dispatch entities based on the updated scene model; determine the availability of additional onsite desired based on the updated scene model; request the new onsite data; and update the scene model based on any onsite data received responsive to any additional requests.

20 Claims, 4 Drawing Sheets

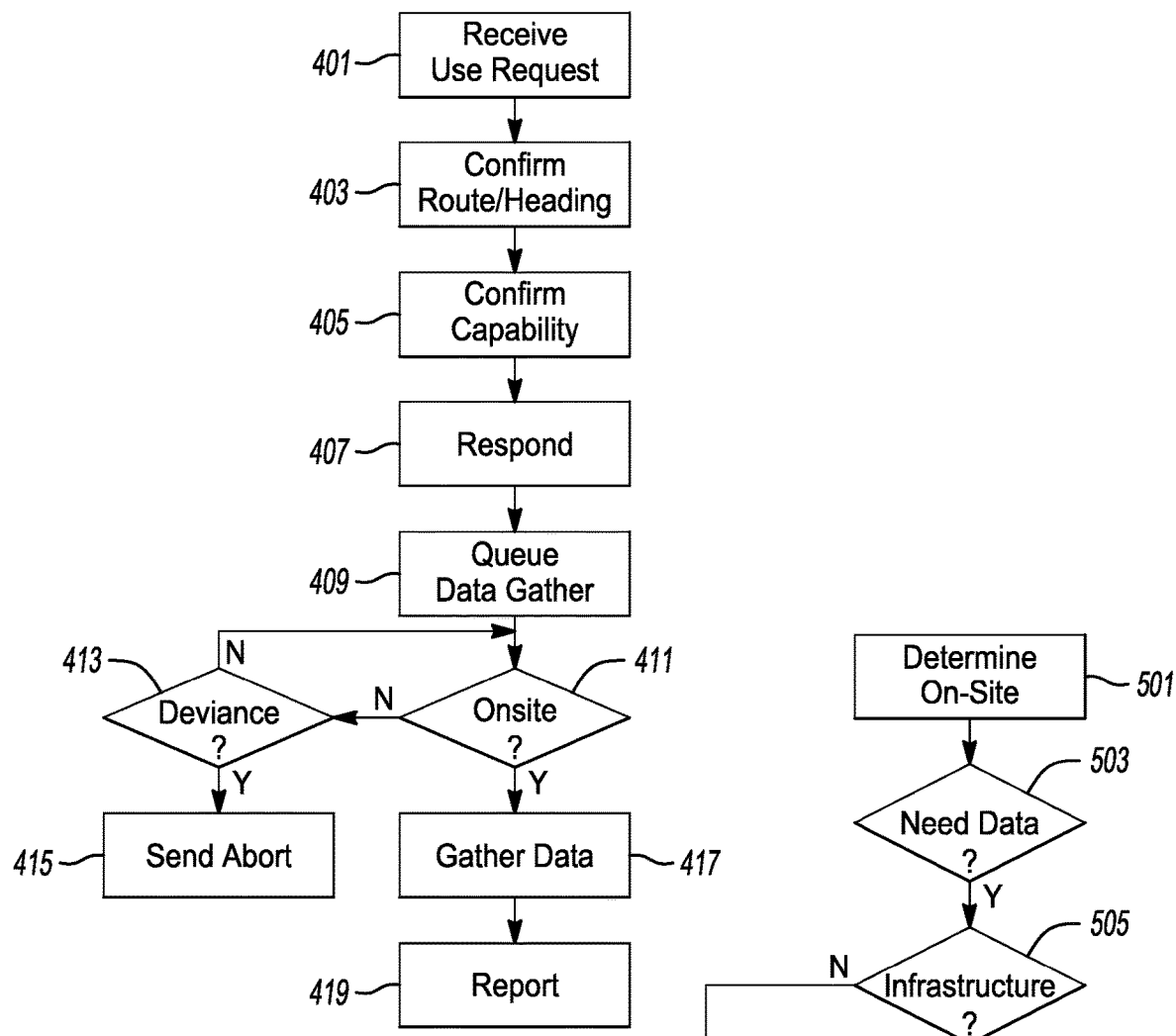

METHODS AND APPARATUSES FOR DYNAMIC CLOUD-BASED VEHICLE DISPATCH

TECHNICAL FIELD

The illustrative embodiments generally relate to methods and apparatuses for dynamic cloud-based vehicle dispatch.

BACKGROUND

Many emergency situations require fast adaptation and special personnel, and as these situations may change quickly, it is not always apparent at the onset what personnel are needed. At the same time, a city cannot afford to dispatch all personnel to all incidents, as more incidents may occur and/or the cost of fully responding to things that may, but which have not yet, occurred, is too high for most cities to bear.

Accordingly, personnel tends to be dispatched on an as-needed basis, which can result in a lag in arrival times as well as including a requirement that there be an observation of the reason for a personnel need prior to the personnel being dispatched. For example, if a vehicle crashes into a building, and EMS vehicle and a police vehicle may be dispatched. The vehicle may have also caused a small fire, but that fire may not be noticed until 30 minutes later, long after initial personnel are on site. By the time a fire truck is dispatched an has arrived, the fire may have spread.

Other issues may also arise if multiple personnel are dispatched down the same route, or dispatched down a route that becomes impeded. Those vehicles may all need to turn around, may congest each other's paths, and may not know where to be positioned when arriving, resulting in additional delays and impediments to an ultimate solution to the problem. Since dispatch may lack the necessary information until someone is onsite (at a traffic jam or at the emergency site), it can be difficult for dispatch to respond in any manner except reactive, where a proactive approach might be impossible due to incomplete information.

SUMMARY

In a first illustrative embodiment, a system includes a processor configured to receive a report of an emergency incident, including reported data relating to the incident. The processor is also configured to dispatch one or more initial entities to respond to the incident, chosen based on the reported data and model an initial scene, based on the reported data.

Further, the processor is configured to determine the availability of travel data, from a predefined preferred source, relating to a preferred travel-path of at least one initial entity and request available travel data relating to the preferred travel-path of the at least one initial entity, based on the determining, including requesting data from a first alternative source when the preferred source is unavailable for at least a portion of the travel-path.

The processor is additionally configured to advise an entity of the feasibility of using the preferred travel path and providing an alternative travel path when the preferred travel path is unacceptable, based on data relating to the preferred travel-path, received responsive to the request.

The processor is also configured to determine an availability of onsite data, from the predefined preferred source, covering one or more locations associated with the incident and request available onsite data covering the one or more locations, based on the determining, including requesting data from a second alternative source for locations for which the preferred source is unavailable to provide coverage.

The processor is further configured to update the scene model based on received onsite data received responsive to the request and determine additional necessary dispatches, data gathering, or both, based on the updated scene model. Until additional data is determined to be no longer needed, the processor is configured to continue to: dispatch any additional entities deemed necessary based on the updated scene model; determine the availability of additional onsite data covering one or more locations associated with the incident based on the updated scene model; request onsite data covering any prior or new locations associated with the incident based on an updated model; and update the scene model based on any onsite data received responsive to any additional requests.

In as second illustrative embodiment, a computer implemented method includes receiving a report of an emergency incident, including reported data relating to the incident. The method also includes dispatching one or more initial entities to respond to the incident, chosen based on the reported data. The method further includes modeling an initial scene, based on the reported data, determining the availability of travel data, from a predefined preferred source, relating to a preferred travel-path of at least one initial entity, and requesting available travel data relating to the preferred travel-path of the at least one initial entity, based on the determining, including requesting data from a first alternative source when the preferred source is unavailable for at least a portion of the travel-path.

The method additionally includes advising an entity of the feasibility of using the preferred travel path and providing an alternative travel path when the preferred travel path is unacceptable, based on data relating to the preferred travel-path, received responsive to the request. Also, the method includes determining an availability of onsite data, from the predefined preferred source, covering one or more locations associated with the incident and requesting available onsite data covering the one or more locations, based on the determining, including requesting data from a second alternative source for locations for which the preferred source is unavailable to provide coverage. The model includes updating the scene model based on received onsite data received responsive to the request as well as determining additional necessary dispatches, data gathering, or both, based on the updated scene model.

Until additional data is determined to be no longer needed, the method may continue dispatching any additional entities deemed necessary based on the updated scene model and determining the availability of additional onsite data covering one or more locations associated with the incident based on the updated scene model. The method will also continue requesting onsite data covering any prior or new locations associated with the incident based on an updated model and updating the scene model based on any onsite data received responsive to any additional requests.

In a third illustrative embodiment, a non-transitory storage medium stores instructions that, when executed, cause a processor to perform a computer implemented method that includes receiving a report of an emergency incident, including reported data relating to the incident. The method also includes dispatching one or more initial entities to respond to the incident, chosen based on the reported data. The method further includes modeling an initial scene, based on the reported data, determining the availability of travel data, from a predefined preferred source, relating to a preferred travel-path of at least one initial entity, and requesting available travel data relating to the preferred travel-path of the at least one initial entity, based on the determining, including requesting data from a first alternative source when the preferred source is unavailable for at least a portion of the travel-path.

The method additionally includes advising an entity of the feasibility of using the preferred travel path and providing an alternative travel path when the preferred travel path is unacceptable, based on data relating to the preferred travel-path, received responsive to the request. Also, the method includes determining an availability of onsite data, from the predefined preferred source, covering one or more locations associated with the incident and requesting available onsite data covering the one or more locations, based on the determining, including requesting data from a second alternative source for locations for which the preferred source is unavailable to provide coverage. The model includes updating the scene model based on received onsite data received responsive to the request as well as determining additional necessary dispatches, data gathering, or both, based on the updated scene model.

Until additional data is determined to be no longer needed, the method may continue dispatching any additional entities deemed necessary based on the updated scene model and determining the availability of additional onsite data covering one or more locations associated with the incident based on the updated scene model. The method will also continue requesting onsite data covering any prior or new locations associated with the incident based on an updated model and updating the scene model based on any onsite data received responsive to any additional requests.

BRIEF DESCRIPTION OF THE DRAWINGS

FIG. 4 shows and illustrative dynamic sensor usage request; and

FIG. 5 shows an illustrative data completion process.

DETAILED DESCRIPTION

Figure 1:
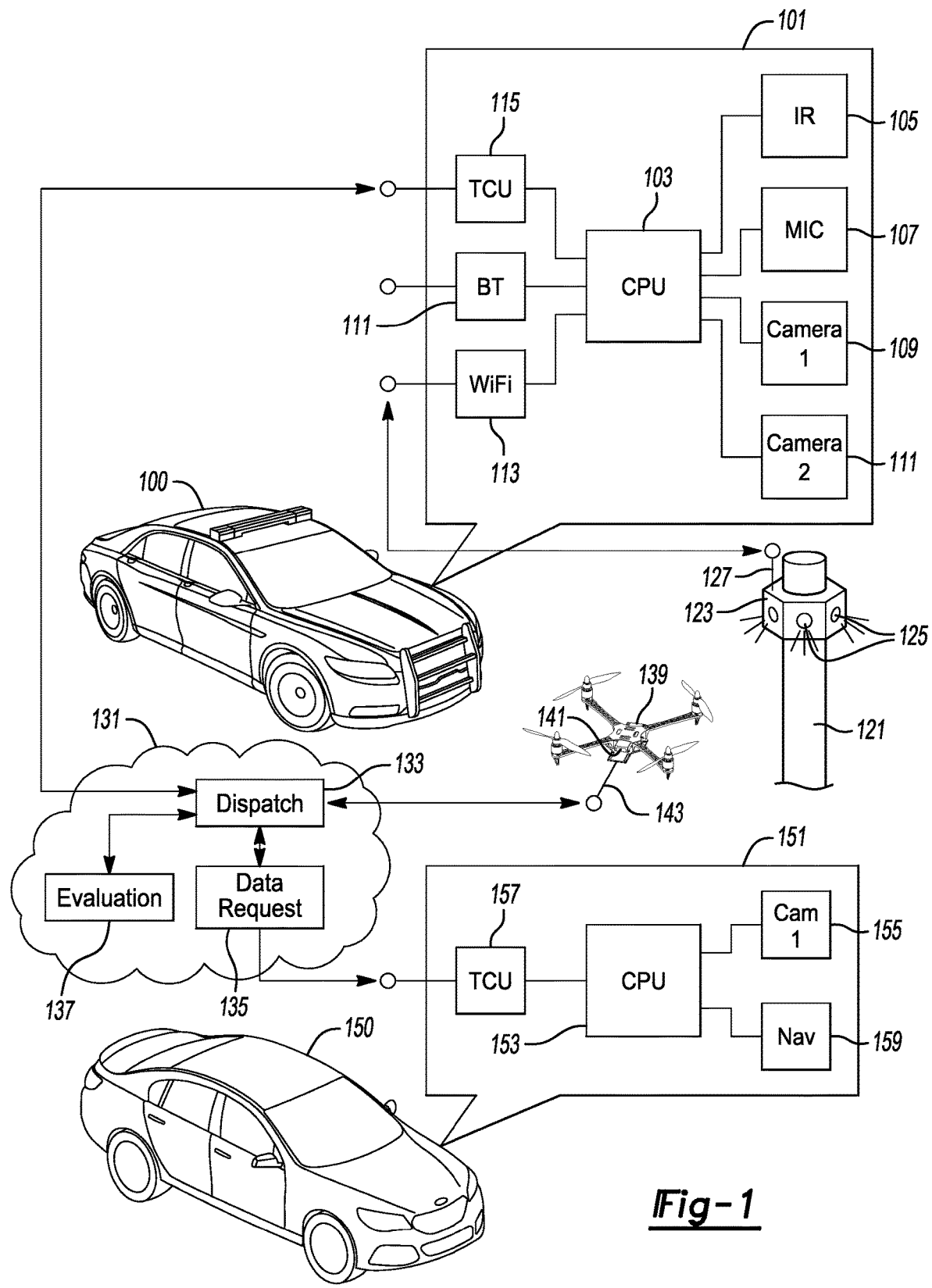
FIG. 1 shows an illustrative example of a sensor-based system including dispatch and various dynamic sensors.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

There are dozens, if not hundreds, of cameras proximate to many intersections and locations within a city. Similarly, on any highway, dozens of cameras may move by a site every minute. Even if there is not a single infrastructure camera, modern vehicles are highly-equipped sensing machines, that have the potential to include LIDAR, RADAR, IR, Night Vision, standard cameras and other sensors. Rain sensors and environmental sensors are also provided on many vehicles, meaning that anywhere a vehicle or vehicles are present, there is the potential for enhanced, immediate, on-site sensing capability.

When not being actively used, most of these sensors sit idle. At the same time, vehicles are frequently connected or connectable to wide range networks (WAN/LAN/PAN Wi-Fi and/or Cellular, for example). At many locations, and especially in the city, there are thus countless sensors already on-site whenever an incident occurs. Whether a burglary, accident, fire, etc., any proximate camera or sensor could theoretically provide live, up-to-date information. This provides an opportunity to crowdsource data for an emergency dispatcher, that can not only reveal the present scene-conditions, but which can also reveal weather and traffic conditions along a route, through use of similar sensors that happen to be viewing or capable of viewing various locations along a projected or preferred route to the incident.

Using information such as this, the dispatcher can make fast decisions about what vehicles to dispatch and where to dispatch them. Changing conditions at the scene can be observed through such sensing, long before emergency personnel arrive, and similarly, changing conditions along a route can be observed. Thus, the dispatcher can react in real-time or near real-time to these conditions, increasing response time and allowing for conveyance of up-to-date information to all interested personnel.

While vehicles may move away from a location, new vehicles may be constantly arriving or passing, and eventually emergency vehicles will arrive onsite with their own sensor suites. Dispatchers can also leverage infrastructure elements (cameras and other sensors) and/or dispatch a drone with appropriate sensing, if needed, in order to maintain information about a scene and to aid in the allocation of emergency resources in an efficient and correctly distributed manner.

If an incident occurs or is reported, a dispatcher can trigger a geo-request to all vehicles and infrastructure elements in a certain proximity to the reported location. Owners may opt into sharing data, or may have some legal requirement to share data. All on-site sensors not being used for other purposes may be leveraged to provide immediate or near-immediate gathering and uploading of on-site data, given a fast and fairly accurate snapshot (if enough sensors are present) of the scene. Images, video and sensor data can be tagged and stored until an incident response is complete, and vision-system processing or other AI type functions may parse the data looking for indications of certain emergency conditions. Similarly, gaps in the data, such as areas not seen, can be quickly identified and the dispatcher can either determine if an infrastructure or vehicle element can see those areas or instruct and onsite personnel or a drone to cover those areas with a camera, to maintain a complete view of the scene. Whether to dispatch vehicles, and which vehicles to dispatch, can be somewhat dictated by sensor data—high winds may create difficulties for drones, rough terrain may require drone dispatch, etc.

This real-time dispatch may also be used to aid fleet vehicles—for example, a delivery vehicle may request information from surrounding vehicles or infrastructure, or have one or more drones dispatched to assist it in route planning. Users may not willingly share vehicle sensor information with delivery vehicles for free, but arrangements between a delivery company and users may create opportunities to share data (e.g., a discount on a delivery membership in exchange for limited data sharing when requested).

FIG. 1 shows an illustrative example of a sensor-based system including dispatch and various dynamic sensors. In this illustrative embodiment, there is an illustrative emergency vehicle 100, an illustrative infrastructure sensor element 123, an illustrative drone 139 and an illustrative vehicle 150. Each can serve as an on-demand sensor and provide potentially different views and information about an incident scene.

For example, vehicle 100 may include an onboard computer 101 equipped with advanced sensing capability, such as infrared (IR) sensor 105, a microphone pickup 107, and a plurality of cameras 109, 111. These are merely illustrative of sensing elements that may be present and are not intended to be an exhaustive representation. The cameras 109, 111 may be positioned to cover multiple fields of view, which allows for changing angles when the vehicle 100 is parked. The IR sensor (or camera) may be directional or aimable. The microphone may be highly sensitive or adjustable in such a manner that it can be used to gather audio information about the scene.

These elements may connect to one or more onboard processors 103 that may further be connected to a telematics control unit (TCU) 115, a BLUETOOTH transceiver 111 and a Wi-Fi transceiver 113. Long range communication elements such as the TCU and/or Wi-Fi transceiver may be usable to communicate gathered information to the dispatcher, and may further be able to communicate with other local sensors such as the sensor array 123 or the drone 139. This allows the drone or sensor array to use the vehicle 100 for upload of information, if either lacks its own high-speed connection. This can also help preserve power in elements such as the drone.

The vehicle 100 can be positioned onsite according to parking instructions from the dispatcher, in order to aim sensors at the relevant portions of the scene. Additionally or alternatively, the dispatcher may have some degree of control over the vehicle 100 sensors, since they are under the purview of the emergency services system.

Infrastructure sensor array 123 may also be provided with a plurality of cameras or other sensors 125 and affixed to poles 121, buildings or other appropriately placed attachment points. These arrays may also fall under city services purview, and thus may be accessible on-demand by a dispatcher and may further be controllable by a dispatcher if the cameras or sensors 125 are movable.

The drone 139 may be launched from vehicle 100 or dispatched by the dispatcher in order to gain a better perspective of a scene or to add sensing capability to a scene. Specialized technology may be included in certain drones, so that infrared, night-vision, etc. sensing may be deployed on-site even if the vehicle 100 lacks the required capability. This allows for the dispatcher to utilized on-demand sensing even in environments where local sensing is deficient, and drones can travel quickly and without impediment to various sites and provide support and sensing capability.

The drone 139 may include one or more cameras 141 or other sensors, as well as wireless communication elements 143 which may include BLUETOOTH, Wi-Fi, Ultra-wideband and/or Cellular or other communication protocol as appropriate. While cellular and sometimes Wi-Fi may provide faster upload and longer-range upload, they may also increase battery drain and prevent the drone from functioning for a maximum time period. As an alternative, the drone 139 could connect to the local vehicle 100 via a BLUETOOTH connection and pass data directly, or use other methods to convey the information without experiencing as much battery drain.

The dispatch 133 may communicate with various sensors through the cloud 131, which can include direct communication with drones 139 and/or emergency vehicles 100. In some instances, such as before an emergency vehicle 100 is on-site, or if the on-site vehicle lacks a perspective or is deficient in regards to one or more sensors, the dispatch 133 may request data through a process 135 that sends a data request to one or more vehicles 150 in a defined proximity of the scene. The request could be broad (e.g., all vehicles within 1000 feet having at least one sensor) or more focused (all vehicles with in 500 feet north, east or west of the scene and having at least one sensor pointed towards the scene). The evaluation process 137 may receive and evaluate incoming data to determine the severity of issues present, perspectives or data that is lacking, etc. This process may also sort and store incoming data for later reference if needed.

The vehicle 100 may be provided with onboard computing 151 that includes a navigation unit 159 and one or more cameras 155, as well as other sensors, connected to one or more onboard processors 153. These sensors may be connected or connectable to the dispatch through the TCU 157 or another wireless networking connection. The driver of the vehicle 150 may be provided with an option to opt-in to a data request, may configure their system 151 to always opt-in to data requests (or at least when a requested sensor is not in use) or may even be required by law to provide data upon request. Compensation may be provided to a driver for excessive data use, or cellular companies and local Wi-Fi services might provide cost-free data when the vehicle 150 feeds are used for such a purpose.

Figure 2:
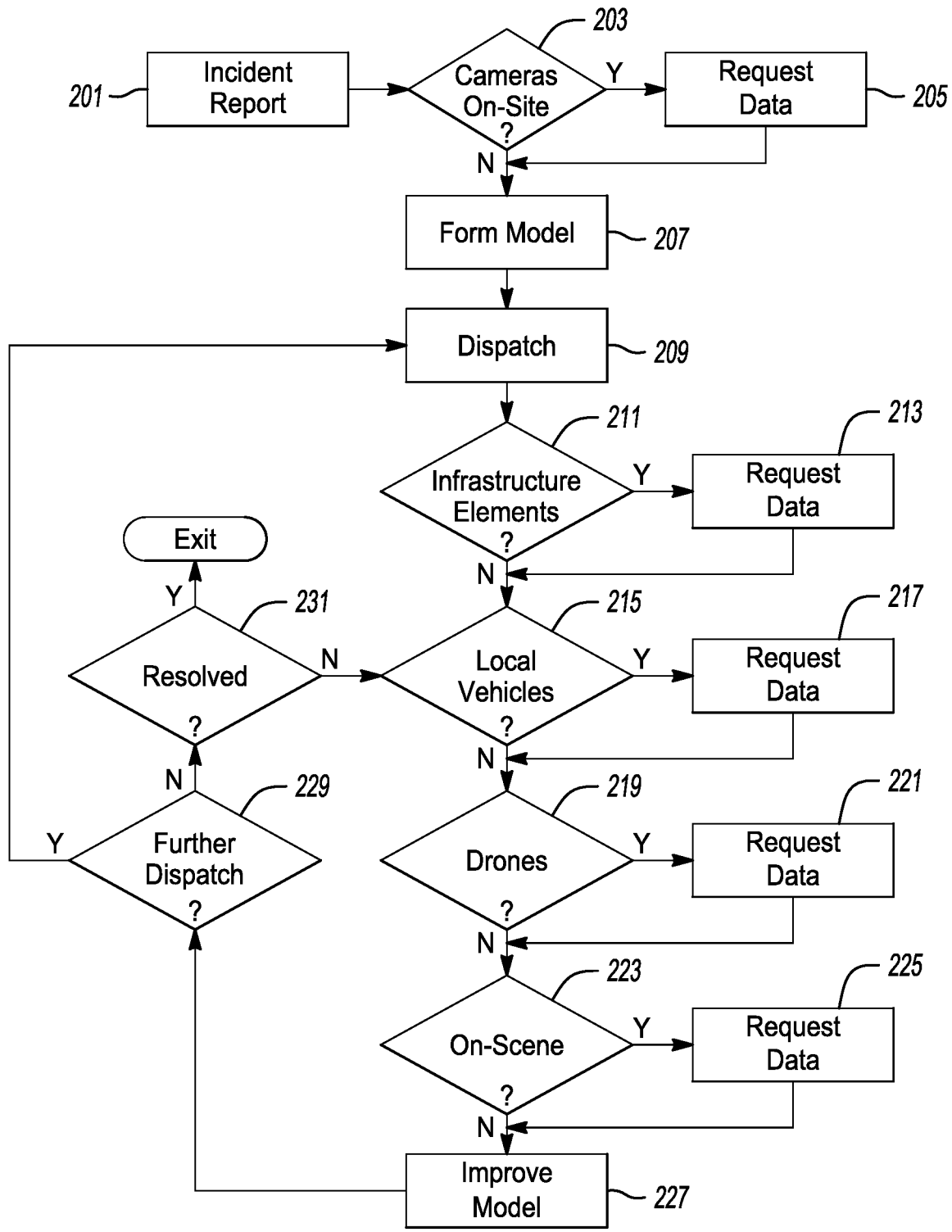
FIG. 2 shows an illustrative data gathering and dispatch process.

FIG. 2 shows an illustrative data gathering and dispatch process. This is a non-limiting example of a full incident report, analysis, data gathering and dispatch process that illustrates how the adaptive system can react to the changing presence of various conditions and sensor elements, reflecting the reality of a dynamic situation wherein mobile sensors arrive and leave and where emergency needs may change with time.

In this example, the dispatch receives an incident report at 201. This could be a phone call, an emergency alert from an infrastructure sensor, a vehicle-sensor reporting an incident, a building alarm, etc. The alert will typically have a geographic component or the emergency operator may be able to determine the location through speaking with a person or based on from where a call originated.

The dispatch process 133 may attempt to determine if there is a camera on-site at 203, which in this example is an element over which the dispatch has control. For example, a bank alarm may automatically send a camera feed, a police officer reporting an incident may automatically trigger a bodycam or vehicle camera feed report, and infrastructure element detecting an incident may include a camera image or footage, a vehicle self-reporting an accident may provide a live camera feed, an image or a pre-recorded feed, etc. If there is a camera onsite at 203 and the dispatch has not yet received the data, or if the camera signals availability for more data, the dispatch process 133 may request additional data from any available, known on-site cameras or other sensors or data providing elements at 205.

The evaluation process 137 can evaluate the data to form a snapshot or scene, which can include vison processing (image and incident recognition), artificial intelligence analysis of video or audio, image merging if more than one image is available to form a model of the scene, to identify blind spots and missing information, etc.

The process may have an "ideal" model for a scene, which can vary based on the incident. For example, if there is a possible fire, the model may include thermal or IR imaging of the surrounding areas and especially the building of interest, as well as images of the access paths and all four sides of the building. In a bank robbery, the ideal scene might include images of the exits and images of all pathways leading from the building in a four block radius, at a minimum. In a car crash, the preferred scene might include live footage of the crash plus thermal imaging in case of fire. In some or all models, the ideal scene might also include data about access paths to the incident for emergency vehicles, including traffic, weather, terrain, etc.

Based on any initial modeling and analysis at 207, the process 133 may dispatch one or more necessary emergency vehicles at 209. This can include what would be a "typical" vehicle for the incident (e.g., a police vehicle 100 for a car crash) as well as any specialty vehicles based on enhanced information (e.g., a fire truck, EMS vehicle, etc.). While current systems are capable of dispatching such vehicles, they often rely on a person observing a condition and reporting the condition, which may not occur until well after the incident occurs. By building the initial model based on data that may be better than a human observer's, the process 133 may have an opportunity to provide enhanced and necessary services in a more rapid manner, which can potentially significantly mitigate injury, death or greater catastrophe. Early dispatch of a fire truck could prevent a small fire from spreading, early dispatch of EMS can prevent a minor injury from becoming life-threatening, etc.

After dispatching whatever vehicles deemed appropriate, the process 133 can seek out missing data and attempt to find data-providing entities capable of filling in the blanks in the data. The evaluation process may reveal what additional data is desired, as noted above, and the process can check for infrastructure elements at 211, local vehicles at 215 or onsite/proximate drones at 219.

Infrastructure elements at 211 are likely to be fixed in location and their presence should be reasonably easily known by an emergency dispatch. If there are elements present, especially if they can provide data at low or no cost, the process may request data at 213 regardless of an immediate need for such data, since having the additional data is unlikely to cause an issue and the cost is negligible.

Onsite vehicles may be determined through communication with vehicles directly, for example in some form of emergency broadcast, or through use of an original equipment manufacturer (OEM) server that can identify what vehicle capabilities are located where. For example, an OEM may not know the user information of a vehicle, but may know that vehicles having certain capabilities are located at certain locations. The OEM server may be capable of direct communication with such vehicles as well, and/or could broadcast to a large number of vehicles with instructions to only process a request if a present location were within a certain distance of the incident location (identified in the request). That would allow most vehicles to disregard the request and would not require the OEM to actually know which vehicles were located where, or establish direct communication with any particular vehicle.

In response to a request, one or more vehicles with appropriate capabilities, headings and/or locations may respond with a willingness to assist the dispatch process. Or, in other examples, it may be legally mandated for sensors not otherwise being used, to assist in the process. The dispatch process could then contact those vehicles directly or request data at 217 from those vehicles through an OEM connection. Local Wi-Fi infrastructure elements could also be used, if the vehicles had sufficient capability, to keep data transfer costs low and bandwidth high.

Drones 139 are not likely to simply be hovering above an incident, unless by happy accident. But, a number of rechargeable drones may be provided to emergency vehicles and/or infrastructure locations throughout a municipality. At 219, the process could determine one or more most-proximate drones and dispatch them to the scene. Since the drones can fly, weather permitting, they should not be slowed by traffic or other physical impediments. This can allow them to reach the scene more quickly than a vehicle that may otherwise transport them, and the dispatch process can request dispatch of the drones at 221 and data when they are onsite.

If the drone is carried by a vehicle 100 that will also be dispatched, the drone can be pathed down a preferred travel path for the vehicle, which can provide the added data relating to traffic and conditions along the recommended path. The drone can also be used to scout new paths and/or report to the scene for surveillance, depending on which is more needed. For example, if the path appears clear, the drone can travel to the scene, but if getting human personnel on site is more critical (e.g., an EMS vehicle), then the drone can be repurposed to scout a new path, if the proposed path from the vehicle to the incident appears to be congested. In such an instance, a different drone may also be dispatched to the scene, if such an entity is also available.

When any dispatched element arrives at the scene at 223, the process may immediately request data feeds from any sensors of the arriving element at 225. Based on angles and information provided from the vehicle 100, the process 133 may further request repositioning of the vehicle 100 or data gathering elements thereof. If the human occupants are otherwise occupied, they can ignore this request, or, in some instances, the dispatch process may be able to reposition a camera, or even a vehicle, using semi-autonomous driving if deemed safe and appropriate (e.g., causing the vehicle to travel or turn a limited amount, if assurances exist that this will not exacerbate the existing incident or cause a new one). Other entities onsite (e.g., a drone overhead), can further assist in maneuvering a vehicle into position by providing a live view if the vehicle is being controlled remotely.

Figure 3:
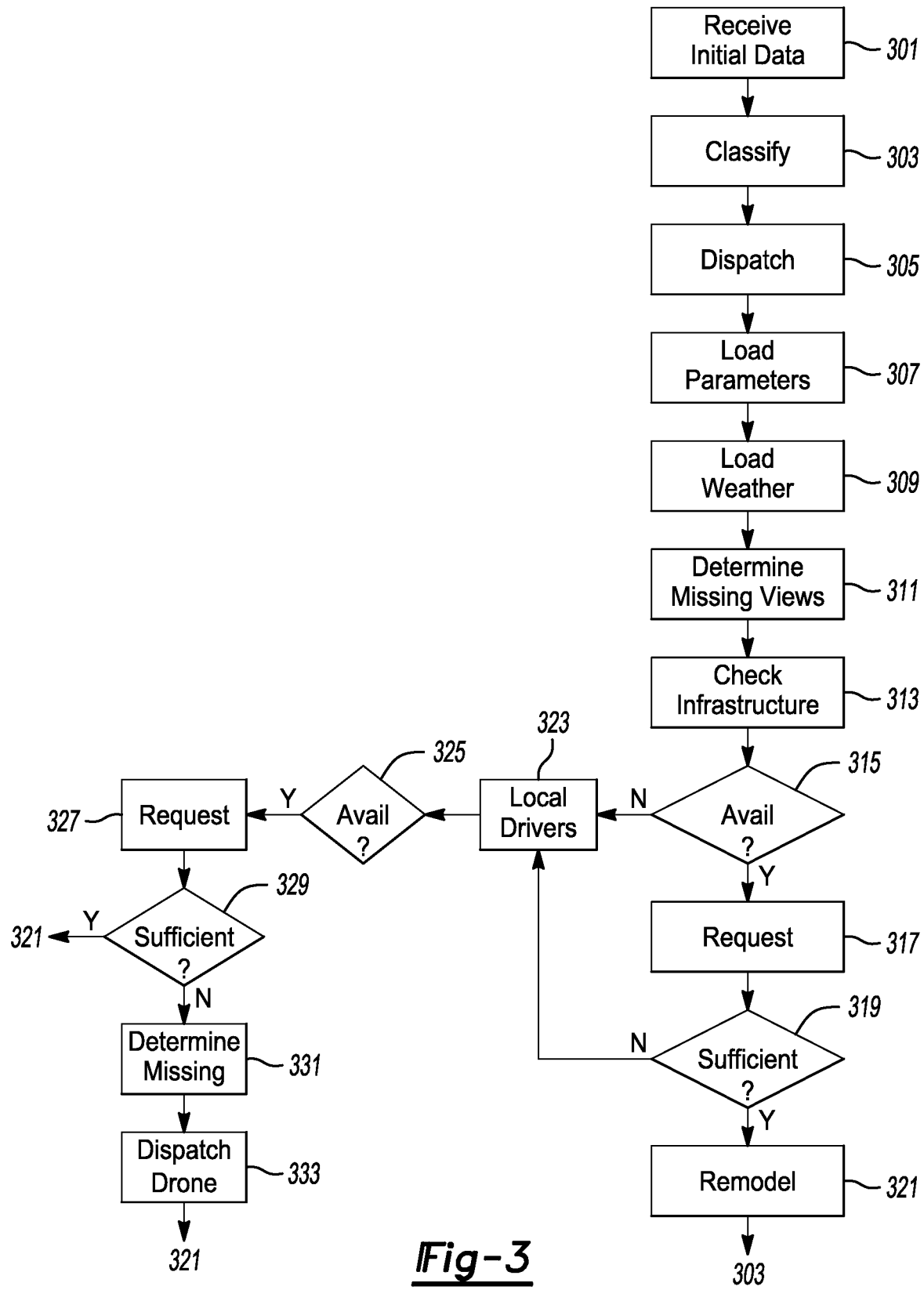
FIG. 3 shows and illustrative data collection process.

FIG. 3 shows and illustrative data collection process. In this evaluation process 137, the process receives the initial data from the scene at 301. This can include any data included with the initial report, and any immediately available data. Since this process is assisting the initial dispatch, and since time may be of the essence, in this example the model is built from whatever data is readily available (e.g., incoming with the alert, immediately accessible from on-site feeds such as infrastructure). The process classifies and labels the data at 303 and the dispatch performs an initial dispatch at 305 based on any initial indications from the data. This include, for example, dispatch of EMS if there is an injury, dispatch of a preferred emergency vehicle for handling the incident based on general type, etc.

While the dispatch is occurring, which may occur quickly so that at least one responder and possibly one set of sensors is dispatched to the site, the evaluation process may build a model of the scene, including evaluating state variables (heat, injury, structural damage, etc). As any particular state evaluation reveals a need, immediate dispatch of secondary personnel can occur. For example, the model may reveal heat not previously noticed, or structural damage to a building. The process may also load parameters for a model 307 based on incident type, for example, identifying what sorts of views and information are preferred based on incident type.

The process can also add weather data at 309, both onsite and along preferred routes. Typically, weather will not present an issue for routed vehicles, unless the weather is very aggressive or is causing other incidents (e.g., flooding), but the weather may affect a drone dispatch. Weather can be added as needed or ignored if the current situation is not one projected to be impacted by any weather states.

The model may also reveal missing information based on the parameters at 311. For example, a potential fire may require a view of all exits and a place for a fire truck to park, as well as a view of hydrants to ensure they are cleared. If only some of this information is currently available, the process can determine what is missing. A city map may give hydrant reference points, a building map may provide exit points, and then the process can determine which of these are not within a field of view.

While the initial dispatch is traveling to the site, the process may prioritize views. For example, confirming a hydrant is clear may be high priority for a fire, and determining a fire has not started may be high priority for a vehicle accident. In the first instance, the process would attempt to obtain a view of a known hydrant location, and in the second instance, the process would attempt to obtain a thermal view of the accident scene.

The process checks the infrastructure elements available at 313, determining if they have appropriate fields of view or can be controlled to view the desired location. If a suitable candidate is found at 315, the process can request a feed and/or control of the camera or sensor if needed. The process can also send pose instructions with a request, if the sensor is capable of self-adjustment. The pose instructions could identify 2D or 3D coordinates of interest, known to be within a sensor's field of view, and the sensor could re-pose to accommodate the point of interest.

If this provides sufficient coverage for the moment at 319, the process may remodel the scene at 321. The process can continually attempt to evaluate the scene until the incident is over, and new data may reveal new needs—for example, if the camera viewing the hydrant revealed a second fire, this could expand the need for viewing coverage and could result in additional data requests, even though the scene had appeared to be accommodated initially by the secondary data request for the camera.

If the infrastructure is not available in sufficient coverage, the process may look for local drivers 323 through direct broadcast (e.g., through a local Wi-Fi network to which drivers may be connected), through communication with a manufacturer server capable of vehicle communication, or any other reasonable method of determining local vehicle sensing capability.

If there are one or more vehicles that respond at 325 or are identified as available, the process can request data from those vehicles at 325. In another example, vehicles can be asked to provide images based on aiming instructions in the initial request, and simply provide such images when possible if the vehicle is in a correct position to obtain such an image. Again, if sufficient data has been obtained for the moment at 329, the process can remodel the scene and determine what, if anything else, is needed.

The ordering of which elements to request is illustrative, although it may be easier for a dispatch operator or computer to obtain infrastructure access than vehicles, and the infrastructure access may be fixed in location, which may provide greater assurances of known coverage. Local cameras may also assist, such as those owned by businesses that are not otherwise occupied.

If additional views are still needed, the process may determine what is missing at 331 and dispatch any proximate drones to provide coverage at 333. In other examples, if drones are readily available, they may be dispatched initially and simply recalled if not needed, since they may be able to most-quickly arrive on scene and can be moved around to accommodate various viewpoints with limited difficulty. If a drone is dispatched, weather conditions may be relevant, as weather could impede both views and flight capability.

FIG. 4 shows and illustrative dynamic sensor usage request. This is an example of a process that may be executed by a vehicle or a server on behalf of a vehicle 150, to determine if the vehicle camera or sensors can be utilized to obtain necessary information.

The process may receive a use request at 401. This could be a direct communication, a broadcast of a request, a request from an OEM server sent on behalf of the dispatch, etc. The request may identify one or more coordinate locations and/or geofences of interest, and the process may be able to determine whether the vehicle is already within, or will be within, viewing proximity at 403. The request may further identify a perspective or angle from which viewing is desired, and/or the heading of the vehicle may also be determined, as vehicle cameras may be fixed in nature and unable to view certain locations if the heading of the camera (based on the heading of the vehicle) is incorrect.

For example, if a vehicle was heading south approaching a building that had a fire on the south face, and the vehicle only possessed a forward-looking camera, the vehicle could see information relative to the north side of the building, and possibly some information related to either an east or west side, as the vehicle passed the building. If the camera was fixedly aimed ahead of the vehicle, however, and the vehicle continued to travel south in general, then it might be difficult for the vehicle to view the south side of the building unless the vehicle were to turn to face that in that direction (e.g., turn left or right immediately after passing the building, to be facing east or west). Accordingly, the request might include headings from which the coordinates or locations are to be viewed, and the vehicle may be able to determine if some or all of a camera field of view will be aimed in the appropriate direction at the appropriate coordinates based on a route to be traveled.

The process may also confirm that the sensor (camera, IR, LIDAR, etc) is appropriate for the requested task at 305, thus confirming that the vehicle 150 includes both the necessary equipment and that the equipment will be able to provide data-of-interest.

The process may execute on a number of vehicles 150, even if only limited numbers of vehicles are needed to actually gather the data. This is because the data gathering can always be aborted, and further, especially if vehicles are not already onsite, it may not be possible to know whether a vehicle will actually reach a scene while the data is still pertinent. By queueing a number of vehicles 150 to assist, the dispatch process has greater assurances that the necessary data will eventually be gathered.

If the vehicle 150 is available to assist, the process can respond affirmatively at 407 and queue data gathering requests as needed at 409. The request from the evaluation/dispatch may indicate what areas are of interest, and the vehicle 150 can determine at what points along a route those areas will be within a known sensor field of view. In other instances, the vehicles can immediately begin gathering and buffering data, or do so within a certain distance of a scene, in case the data is later needed.

Once the vehicle 150 arrives at any location at 411 designated for data gathering by the queue, the vehicle can obtain the requested data at 417 and relay it to the dispatch/evaluation at 419. Relay can be over cellular or Wi-Fi, for example, based on what networks are presently available. Local Wi-Fi networks may provide emergency access to such transfers, and the vehicle 150 could connect with a special designator indicating such assistance is being provided. Cellular companies may similarly decline to impose data usage counts or constraints on such assistance, in order to allow information to quickly and freely flow to the dispatch.

If the vehicle 150 deviates from a route at 413 in a manner that will likely carry it past any areas of interest without opportunity to obtain the data, the process can abort the queue and notify the server at 415 that the vehicle 150 cannot participate and assist. This could cause new requests to be sent, or the dispatch/evaluation process may still be able to rely on other local vehicles to provide the information.

FIG. 5 shows an illustrative data completion process. This allows a system to dynamically and ongoingly determine if there is more data for completion of a model or dispatch scenario. For any given data-gatherer, it is possible that when that entity arrives on-scene, its provided information will reveal a need for additional data. For example, a drone with IR capability arriving on scene, that drone may notice heat signatures indicative of fire or other previously unnoticed elements. This could require both dispatch of Fire Rescue services as well as require gathering more data on the accessibility of building exits, routes for Rescue services to reach the scene, etc. In this manner, this process can continue during the duration of an event, continually updating the dataset, model, and available reporting entities (vehicles, cameras, drones, etc.) until the event completes or the scene reaches an apparent state where no more information need be gathered (at least for that moment).

Once a dispatched entity (an emergency vehicle, drone, requested in-vehicle camera usage, etc.) is on-site at 501, the process will gather data as in step 417. As the data is gathered and reported to the server, the server will continue to update the model for the situation. Updating the model and/or the new data may reveal the need for additional data at 503, which can be needed to effectively deploy personnel, dispatch additional vehicles, warn onsite personnel or affected parties, etc.

If there is an infrastructure element available to provide the data at 505, which in this example is an element that is under requestable control of the emergency services, the process and/or emergency services personnel may request usage of the infrastructure camera at 507. For example, using the drone and IR example from above, if the drone arrives on scene and detects significant heat, the process using the model may dispatch a fire truck and seek to ensure that the building is not burning elsewhere and that the exits are clear and usable.

This may require, for example, usage of fifteen cameras along possible routes (known once the fire truck confirms dispatch), information about several miles of road not currently covered by infrastructure cameras, information about two building exits covered by infrastructure cameras, and information about one building exit not covered by an infrastructure camera.

For the locations where an infrastructure camera can be used, the process would request data from those cameras until it was no longer needed—e.g., for the route cameras, once the truck had passed (assuming it did not need the data for exit route planning), and for the building exit cameras, the data may be gathered until no people (occupants or emergency personnel) remained inside the building, or until the incident was declared over.

For the stretch of roadway not covered by cameras, and for the building exit not covered by a camera, the process may request additional data at 515. This can include leveraging proximate vehicles with cameras and/or further drone dispatch and/or repurposing the on-site drone if the other reason for its presence is no longer necessary, or if it can alternate tasks.

Additionally, if the data receive from the infrastructure cameras at 509 is insufficient at 511 (e.g., if a camera view is partially or fully blocked) or does not completely cover the area of interest, then the process can request additional data as described above at 515. The gathered data can then be sent to the cloud model processing at 513.

Further, the above process may execute wholly or partially within a vehicle, such as a police vehicle, allowing the police vehicle to either access infrastructure cameras to gather onsite data and/or send requests to the cloud for additional data from other elements that may not be directly accessible through the police vehicle. While the police vehicle may not directly request data for locations such as a route for fire trucks, since it may not be responsible for dispatch of those entities, an onsite cruiser may want a complete overhead view of the scene, and so may leverage camera data from infrastructure cameras surrounding the scene, which may be wirelessly controllable from the police vehicle through a local network or direct communication, for example. Then, if the officer felt more data was needed at 511, or if the infrastructure cameras did not exist onsite at 505, the request could be made for additional data.

In these and similar manners, a dynamic and adaptive dispatch and modeling process can continually leverage data from a variety of repurposable entities, that allows for continual modeling of a scene, continual dispatch of entities in a highly responsive manner, improved response times and improved scene perspective, as additional data gathering can always be requested responsive to newly revealed potential issue.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system comprising:
a processor configured to:
receive a report of an emergency incident, including reported data relating to the incident;
dispatch one or more initial entities to respond to the incident, chosen based on the reported data;
model an initial scene, based on the reported data;
determine the availability of travel data, from a predefined preferred source, relating to a preferred travel-path of at least one initial entity;
request available travel data relating to the preferred travel-path of the at least one initial entity, based on the determining, including requesting data from a first alternative source when the preferred source is unavailable for at least a portion of the travel-path;
based on data relating to the preferred travel-path, received responsive to the request, advise an entity of the feasibility of using the preferred travel path and providing an alterative travel path when the preferred travel path is unacceptable;
determine an availability of onsite data, from the predefined preferred source, covering one or more locations associated with the incident;
request available onsite data covering the one or more locations, based on the determining, including requesting data from a second alternative source for locations for which the preferred source is unavailable to provide coverage;
update the scene model based on received onsite data received responsive to the request;
determine additional necessary dispatches, data gathering, or both, based on the updated scene model; and
until additional data is determined to be no longer needed, continue to:
dispatch any additional entities deemed necessary based on the updated scene model;
determine the availability of additional onsite data covering one or more locations associated with the incident based on the updated scene model;
request onsite data covering any prior or new locations associated with the incident based on an updated model; and
update the scene model based on any onsite data received responsive to any additional requests.

2. The system of claim 1, wherein the dispatch of one or more initial entities includes a dispatch of a data-gathering entity responsive to the reported data representing less than a predefined desired completeness of data for a type of incident indicated based on the reported data.

3. The system of claim 2, wherein the data gathering entity includes a drone.

4. The system of claim 1, wherein the preferred source includes one or more infrastructure cameras, and wherein the source being unavailable includes the camera already being in use for another function or not providing viewing coverage of an area of the travel-path.

5. The system of claim 1, wherein at least one of the preferred source or the first or second alternative source includes one or more cameras of private passenger vehicles and wherein the request for at least one of travel data or onsite data includes a coordinate or geofenced location requested to be captured by the camera.

6. The system of claim 5, wherein the request further includes one or more headings from which the preferred coordinates or geofenced location are to be captured.

7. The system of claim 1, wherein the one or more locations associated with the incident are determined based on at least a type of the incident and a proximity to a reported location of the incident.

8. A computer implemented method comprising:
receiving a report of an emergency incident, including reported data relating to the incident;
dispatching one or more initial entities to respond to the incident, chosen based on the reported data;
modeling an initial scene, based on the reported data;
determining the availability of travel data, from a predefined preferred source, relating to a preferred travel-path of at least one initial entity;
requesting available travel data relating to the preferred travel-path of the at least one initial entity, based on the determining, including requesting data from a first alternative source when the preferred source is unavailable for at least a portion of the travel-path;
based on data relating to the preferred travel-path, received responsive to the request, advising an entity of the feasibility of using the preferred travel path and providing an alterative travel path when the preferred travel path is unacceptable;
determining an availability of onsite data, from the predefined preferred source, covering one or more locations associated with the incident;
requesting available onsite data covering the one or more locations, based on the determining, including requesting data from a second alternative source for locations for which the preferred source is unavailable to provide coverage;
updating the scene model based on received onsite data received responsive to the request;
determining additional necessary dispatches, data gathering, or both, based on the updated scene model; and
until additional data is determined to be no longer needed, continue:
dispatching any additional entities deemed necessary based on the updated scene model;
determining the availability of additional onsite data covering one or more locations associated with the incident based on the updated scene model;
requesting onsite data covering any prior or new locations associated with the incident based on an updated model; and
updating the scene model based on any onsite data received responsive to any additional requests.

9. The method of claim 8, wherein the dispatching of one or more initial entities includes dispatching of a data-gathering entity responsive to the reported data representing less than a predefined desired completeness of data for a type of incident indicated based on the reported data.

10. The method of claim 9, wherein the data gathering entity includes a drone.

11. The method of claim 8, wherein the preferred source includes one or more infrastructure cameras, and wherein the source being unavailable includes the camera already being in use for another function or not providing viewing coverage of an area of the travel-path.

12. The method of claim 8, wherein at least one of the preferred source or the first or second alternative source includes one or more cameras of private passenger vehicles and wherein the request for at least one of travel data or onsite data includes a coordinate or geofenced location requested to be captured by the camera.

13. The method of claim 12, wherein the request further includes one or more headings from which the preferred coordinates or geofenced location are to be captured.

14. The method of claim 8, wherein the one or more locations associated with the incident are determined based on at least a type of the incident and a proximity to a reported location of the incident.

15. A non-transitory storage medium storing instructions that, when executed, cause a processor to perform a computer implemented method comprising:
receiving a report of an emergency incident, including reported data relating to the incident;
dispatching one or more initial entities to respond to the incident, chosen based on the reported data;
modeling an initial scene, based on the reported data;
determining the availability of travel data, from a predefined preferred source, relating to a preferred travel-path of at least one initial entity;
requesting available travel data relating to the preferred travel-path of the at least one initial entity, based on the determining, including requesting data from a first alternative source when the preferred source is unavailable for at least a portion of the travel-path;
based on data relating to the preferred travel-path, received responsive to the request, advising an entity of the feasibility of using the preferred travel path and providing an alterative travel path when the preferred travel path is unacceptable;
determining an availability of onsite data, from the predefined preferred source, covering one or more locations associated with the incident;
requesting available onsite data covering the one or more locations, based on the determining, including requesting data from a second alternative source for locations for which the preferred source is unavailable to provide coverage;
updating the scene model based on received onsite data received responsive to the request;
determining additional necessary dispatches, data gathering, or both, based on the updated scene model; and
until additional data is determined to be no longer needed, continue:
dispatching any additional entities deemed necessary based on the updated scene model;
determining the availability of additional onsite data covering one or more locations associated with the incident based on the updated scene model;
requesting onsite data covering any prior or new locations associated with the incident based on an updated model; and
updating the scene model based on any onsite data received responsive to any additional requests.

16. The storage medium of claim 15, wherein the dispatching of one or more initial entities includes dispatching of a data-gathering entity responsive to the reported data representing less than a predefined desired completeness of data for a type of incident indicated based on the reported data.

17. The storage medium of claim 16, wherein the data gathering entity includes a drone.

18. The storage medium of claim 15, wherein the preferred source includes one or more infrastructure cameras, and wherein the source being unavailable includes the camera already being in use for another function or not providing viewing coverage of an area of the travel-path.

19. The storage medium of claim 15, wherein at least one of the preferred source or the first or second alternative source includes one or more cameras of private passenger vehicles and wherein the request for at least one of travel data or onsite data includes a coordinate or geofenced location requested to be captured by the camera and wherein the request further includes one or more headings from which the preferred coordinates or geofenced location are to be captured.

20. The storage medium of claim 15, wherein the one or more locations associated with the incident are determined based on at least a type of the incident and a proximity to a reported location of the incident.

\* \* \* \* \*